June 21, 1949.  A. EDELMAN  2,473,578

TOTALIZER

Filed April 3, 1945  3 Sheets-Sheet 1

INVENTOR.
ABRAHAM EDELMAN
BY Ernest D. Given
ATTORNEY

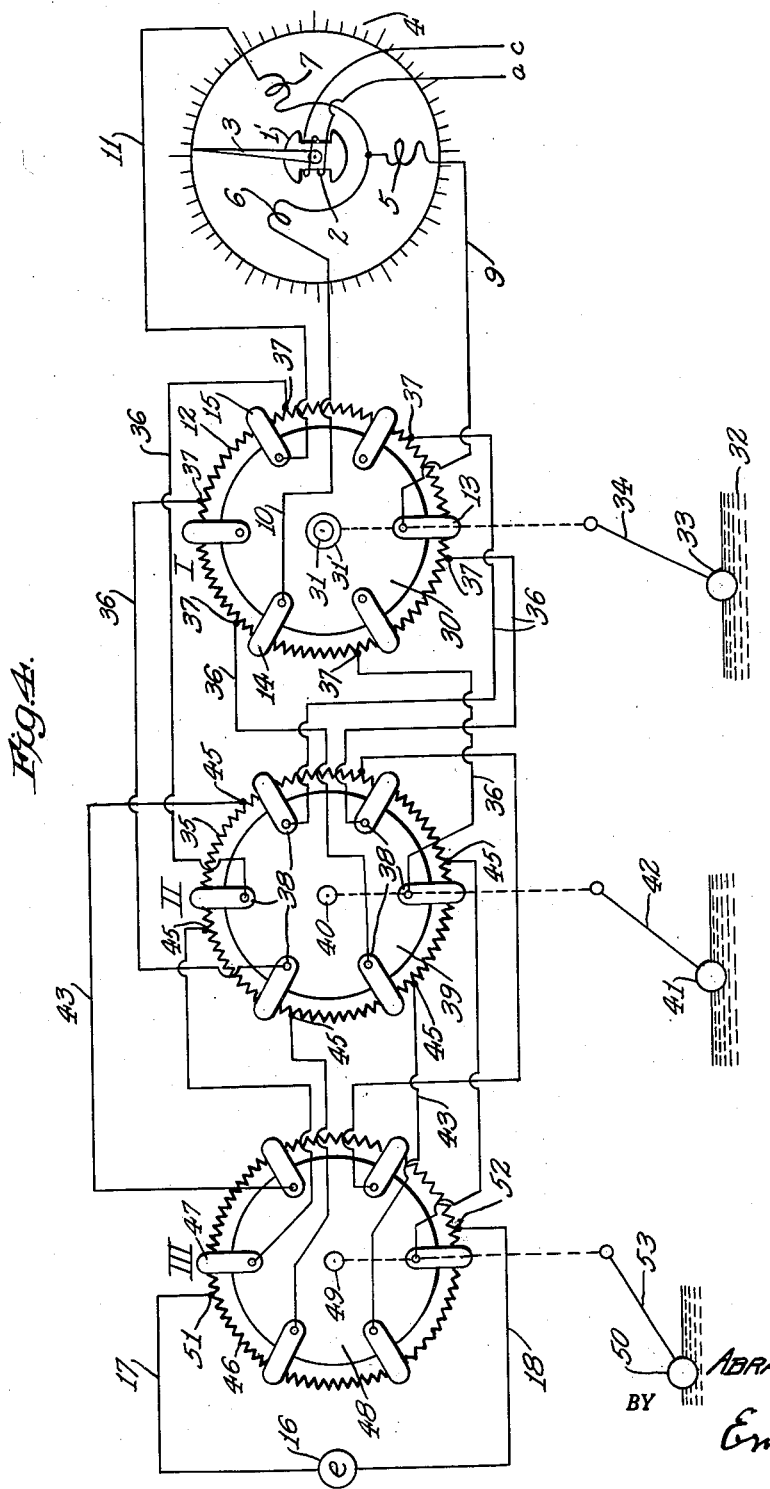

June 21, 1949.                A. EDELMAN                2,473,578
                              TOTALIZER
Filed April 3, 1945                             3 Sheets-Sheet 3
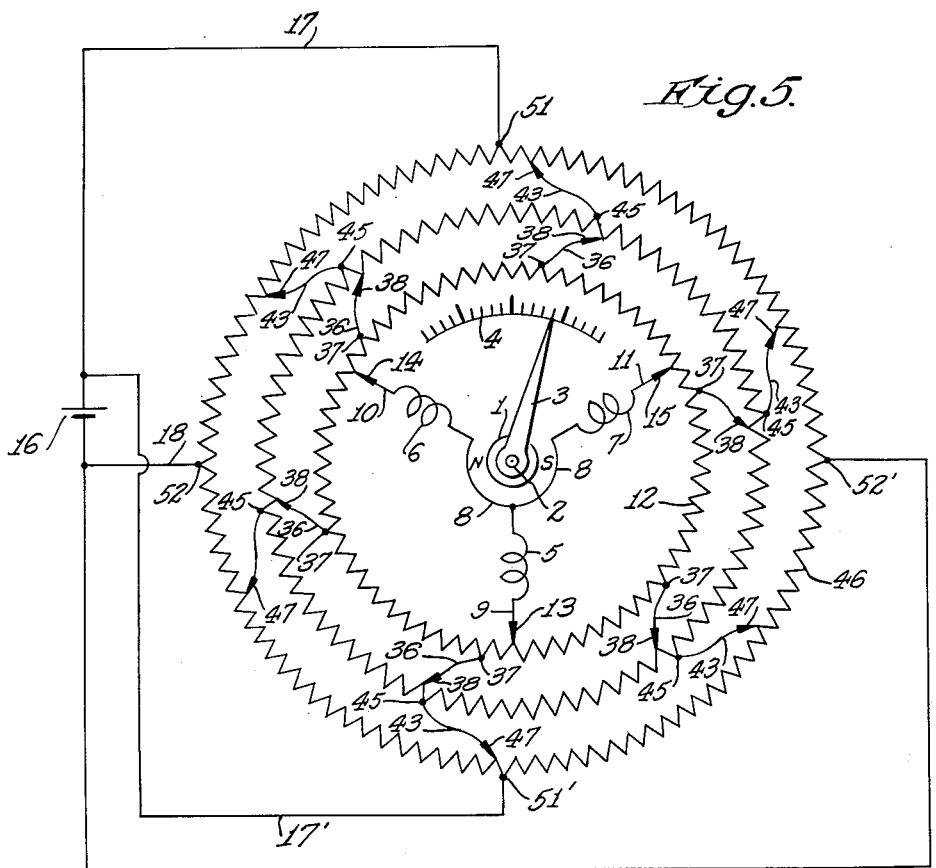
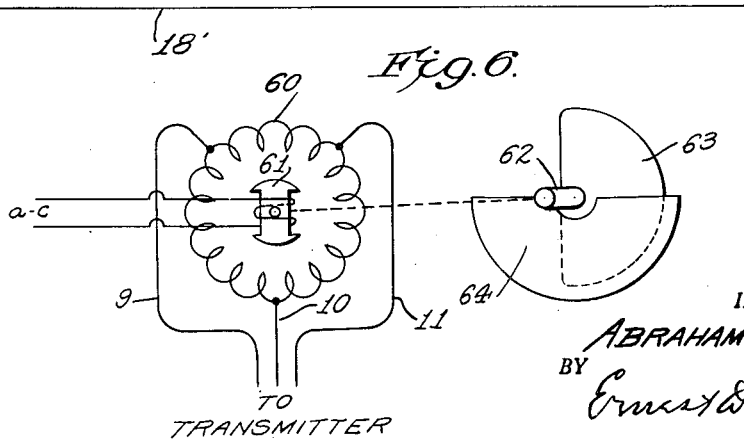
INVENTOR.
ABRAHAM EDELMAN
BY
Ernest D. Sivin
ATTORNEY Patented June 21, 1949

2,473,578

UNITED STATES PATENT OFFICE 2,473,578

TOTALIZER

Abraham Edelman, New York, N. Y., assignor to The Liquidometer Corporation, Long Island City, N. Y., a corporation of Delaware Application April 3, 1945, Serial No. 586,410

7 Claims. (Cl. 177—351)

This invention relates to improvements in totalizing or averaging systems or devices in which the operation of a receiving means is controlled by two or more transmitting means each controlled by a change of a unit to be supervised. It relates particularly to improvements in totalizing systems or devices in which a plurality of transmitters each controlled by a change of a unit to be supervised or checked electrically controls a common receiver so that this receiver reproduces the sum total of the changes of all the transmitters.

The invention is applicable to many purposes and in various fields. It is of particular advantage for measuring volumes of liquids in containers and totalizing the same for the purpose of measuring the total contents of a plurality of containers or tanks.

One of the objects of the invention is the provision of a plurality of transmitters each assigned to a magnitude to be measured and controlled in its position by the corresponding magnitude. These transmitters coact together so that a movement of one transmitter is superimposed upon the movement of other transmitters thereby totalizing the movements of all of the transmitters.

Another object of the invention is the provision of electrical means for interconnecting the transmitters and the receiver.

Another object of the invention is the provision of a receiver capable of reproducing the sum total of transmitter movements substantially without loss of torque in the receiver mechanism, and practically without restriction of the range of movement; for example, the receiver can be conveniently designed to move through a range of several complete revolutions or of a fraction of a complete revolution.

According to a now preferred embodiment of the invention the above enumerated objects and further objects and advantages which will be more fully explained hereinafter are accomplished by providing as transmitters two or more ring type resistors mounted in spaced apart relation. The rings are interconnected, preferably symmetrically, by three or more electric wires which are connected at fixed points to one of two interconnected transmitter rings and engage slidably the other transmitter ring. The slidable wire connections are displaced corresponding to a change of a unit to be checked or measured, as for example, a liquid level, such displacements being made without varying the electrical distances between the slidable connecting points. One of the transmitter rings is connected to a receiver by wires, the connection points of which at the ring are also displaced corresponding to a change of the unit to be measured without varying the electrical distances between the connected points. The electrical conditions of the entire transmitter system will then be controlled by the sum total of all the changes of the unit to be checked or measured and the receiver will reproduce the total change in the transmitter system.

In the accompanying drawings several now preferred embodiments of the invention are shown by way of illustration and not by way of limitation.

Fig. 4 shows diagrammatically the circuit arrangement of a totalizing system according to the invention.

Fig. 5 is a modification of the circuit arrangement shown in Fig. 4, and

Fig. 6 shows a modification of the receiver of the totalizing system.

Figure 1:
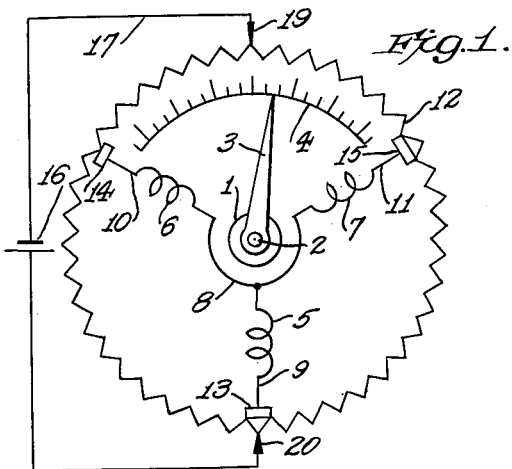
Fig. 1 shows a basic circuit system from which circuit arrangements according to the invention are derived.

The circuit arrangement according to Fig. 1, from which the circuit systems according to the invention hereinafter described are derived, consists of a transmitter and a receiver. The receiver comprises a magnetic rotor 1 mounted on a rotatable shaft 2, and a pointer 3 mounted on the same shaft and coacting with a scale 4. The magnet rotor which may be a permanent magnet or an electromagnet is magnetized across a diameter and will rotate to point in the direction of a magnetic field in which it is placed. Such a magnetic field is created by coils 5, 6 and 7 which are relatively stationary and placed to surround the rotor and to direct their flux into the rotor. The coils are connected together at their inner ends by a common lead 8. At the outer ends, the coils are connected by leads 9, 10 and 11 to the transmitter comprising a ring 12 which may be located at a distance. The transmitter is preferably electrically in the form of a continuous resistor having no ends but returning unto itself and may be made of resistance wire wound uniformly on a ring carrier so that sliders may make contact with all parts of the resistance wire. The transmitter may, of course, be of any other design according to the needs of any particular construction, for example, to totalize or average rectilinear movements. Three taps 13, 14 and 15 are provided on the ring 12 at equidistant points for connecting leads 9, 10 and 11 to ring 12. A battery 16 is connected by leads 17, 18 to taps 19, 20 which are placed 180 degrees apart. The taps 19, 20 are slidably mounted on the ring for simultaneous displacement of both taps without varying their distance apart from each other.

With connections as previously described the currents flowing through coils 5, 6, 7 will be so controlled that any rotation of the slidable taps 19, 20 on and around the ring 12 while still remaining 180 degrees apart from each other will cause an approximately similar rotation of the resultant magnetic field at the rotor 1 and hence also of the rotor and the pointer 3. The same result could, of course, be obtained by moving instead taps 13, 14, 15 in the opposite direction without varying their equidistant displacement.

Figure 2:
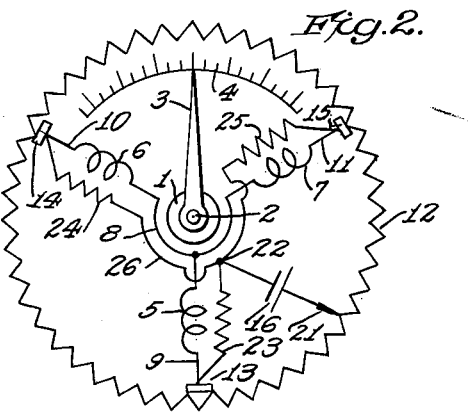
Fig. 2 is another basic circuit system.

Fig. 2 illustrates an important modification of the basic circuit shown in Fig. 1. With the arrangement according to Fig. 2 only one sliding tap is required. As it will appear from Fig. 2 one terminal of the battery 16 is connected to a tap 21 slidable on transmitter ring 12. The other terminal of the battery is connected to the center 22 of three resistors 23, 24, 25 which are joined in Y by a common lead 26. The other ends of the resistors are connected to taps 13, 14, 15 in the same manner as the coils.

It has been found that a circuit system according to Fig. 2 performs very similarly to a circuit system according to Fig. 1, so that if the battery slider 21 is rotated on transmitter ring 12 the resultant magnet field controlling the rotor 1 will rotate correspondingly so that the rotor and the pointer will follow the movements of the slider 21 and approximately duplicate them.

Figure 3A:
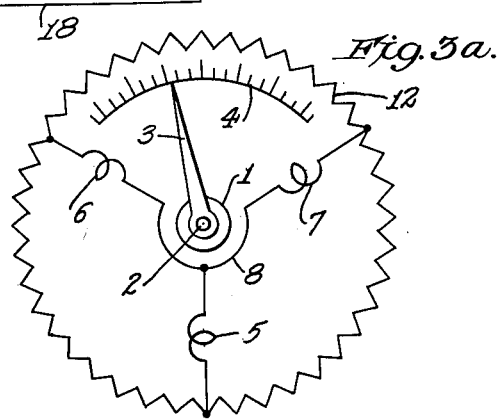
Figs. 3a, 3b, 3c and 3d show four different receiver arrangements which may be used in conjunction with circuit arrangements according to the invention.
Figure 3B:
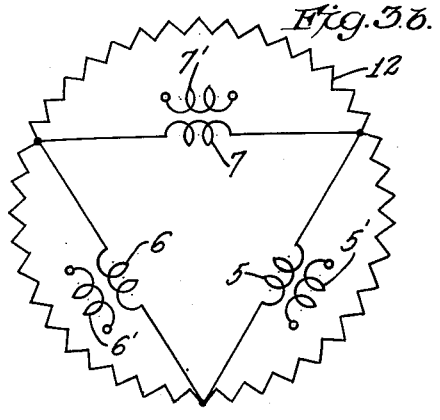
Figure 3C:
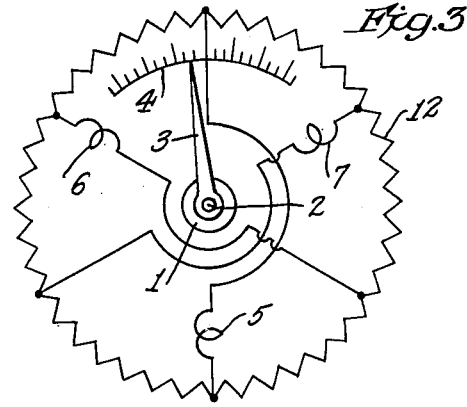
Figure 3D:
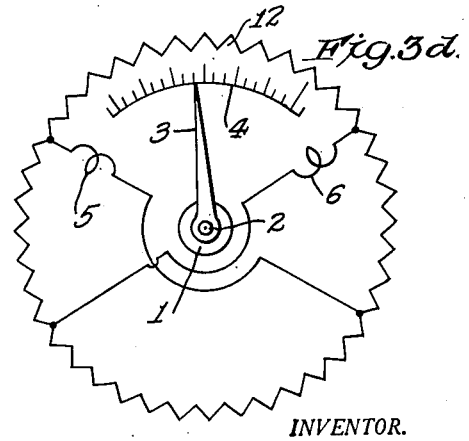

There are, of course, numerous variations of the basic circuit possible. Figs. 3a to 3d show four of the possible arrangements: Fig. 3a illustrates a three wire-Y connection, Fig. 3b a three wire-delta connection, Fig. 3c a six wire-system in which three coils are arranged in cross, and Fig. 3d a four wire-system in which two coils are arranged at an angle of 90 degrees. According to Figs. 3a, 3c and 3d the receiver controlled by resistor ring 12 comprises a permanent magnet 1 while in Fig. 3b the coils 5, 6, 7 connected to ring 12 serve as primaries of transformers, the secondaries 5', 6', 7' of which may be connected to suitable circuit systems. It will be understood that such circuit systems will be controlled by the potential pattern of ring 12. It will further be understood that instead of an A.-C. system such as shown in Fig. 3b a D.-C. system may be provided. The coils can then be used to control, for example, relay circuits.

Figs. 4 and 5 show modifications of circuit arrangements of totalizing systems according to the invention. Each of the systems shown in Figs. 4 and 5 consists of several transmitters generally designated I, II, III and a common receiver. A plurality of transmitters may be provided so that the total contents of any desired number of tanks or containers may be simultaneously gauged and indicated on the common receiver. However, it should be understood that while the receiver is illustrated as an indicating device, a totalizing system according to the invention is not limited to an indicating receiver. It is also quite possible to use the movement of the receiver rotor or any other suitable moving part of the receiver to control, for example, a variable condenser or any other member not requiring a substantial torque as will be more fully explained hereinafter. Furthermore, it is entirely practical to employ the totalizing action of the transmitter system to control electrical circuits of a receiver which in turn may control power circuits so that any desired load may be moved corresponding to the totalizing action of the transmitter system.

Referring now specifically to Fig. 4 the common receiver comprises a rotor 1' mounted on rotatable shaft 2 which also supports pointer 3 coacting with the scale 4 shown here as a circular scale, so that angular movements of pointer 3 may be indicated within the range of one or more complete revolutions.

It will be noted the rotor magnet 1 is shown as an electromagnet magnetized from a source of alternating current. Such rotor will reverse its magnetization as the coils 5, 6 and 7 surrounding the rotor as previously described reverse their polarity, if the same A.-C. source 16 is used. It should, of course, be understood that the invention is not limited to the type of receiver shown in the drawings but that many other suitable types well known in the art may be employed. For example, receiver indicators employing a solenoid pull from each coil onto a soft iron rotor arm, moving coil indicators of the crossed coil type, etc. may be used. Furthermore, D.-C. indicators may be operated from A.-C. current through the use of rectifiers and then the system shown in Fig. 4 may be used with a rotor having a permanent magnet.

The receiver is connected to resistor ring 12 of the first transmitter I by means of three equidistant taps 13, 14 and 15. These taps are adjustable without varying their equidistant displacement. For this purpose the taps may be supported on an insulation disc 30 mounted on a rotatable shaft 31 so that the taps can be rotated relative to resistor ring 12 without varying their equidistant displacement.

The angular position of the disc 30 is to be controlled by the level of a liquid 32 in a container (not shown). For this purpose a float 33 is provided coupled with shaft 31 by any suitable transmission means 34 which will turn the disc to various positions according to the rise and fall of the float.

The resistor ring 12 of the first transmitter I is connected to a set of slidable taps on a similar transmitter ring 35 of transmitter II by a number of wires 36, six of which are shown. Each wire 36 is connected at one end to a tap 37 on the resistor ring 12 and at the other end to a tap 38 slidably engaging resistance wire 35 of transmitter II. The taps 37 are shown as fixed taps and the taps 38 as slidable taps. All taps 38 are supported on an insulation disc 39 similar to insulation disc 30, mounted on a rotatable shaft 40. The angular position of disc 39 is controlled by the level of another liquid to be measured for instance by means of a float 41 coupled to shaft 40 by means of a transmission 42.

Transmitter II is connected to transmitter III in a similar manner as has been described for the connection between transmitters I and II. Connection wires 43 are fixed at one end to points 45 of resistor ring 35 and connect this ring with the corresponding resistor ring 46 of transmitter III by means of slidable taps 47 engaging resistor ring 46.

Taps 45 are shown as fixed taps and taps 47 as slidable taps. Taps 47 are supported on an insulating disc 48 mounted on a rotatable shaft 49. The angular position of disc 48 is controllled by the level of a third liquid to be measured by means of a float 50 and a transmission means 53.

The source of current which is shown in the circuit as a source of alternating current 16 is connected to the resistor ring of one of the transmitters, for example, to resistor ring 46 of transmitter III by leads 17 and 18. The connecting points 51 and 52 between leads 17 and 18 and resistor ring 46 are shown as stationary and 180 degrees apart.

As previously mentioned, six wires are shown as connections between the transmitters. However, it should be understood that any number of wires from two wires up may be employed. All sets of taps between two transmitters are preferably arranged equidistantly. However, this is not necessary. Furthermore, it is preferable to provide an equal number or a substantially equal number of wire connections between each two transmitters.

The position of the slidable taps relative to the corresponding resistor rings may be controlled by any suitable means. The illustrated floats are only one of the many possible arrangements.

The operation of a totalizing system according to the invention is as follows:

For purpose of explanation only the actions of the part of the circuit including transmitters I and II are considered for the time being. If it be assumed that each resistor ring 12, 35 is of 100 ohms resistance, consists of 100 turns of resistance wire and is wound on a toroidal insulating carrier, and, furthermore, if it be assumed that instead of the illustrated six connecting wires 36, a hundred such wires are provided, each interconnecting a turn on ring 12 to a corresponding turn on ring 35, then it will be apparent that the two resistor rings are so closely tied together by the hundred wires 36 that they may be considered as a single ring of 50 ohms resistance as far as their electrical influence on the remainder of the circuit is concerned. Furthermore, if a tap or slider is placed upon a turn of resistance wire of ring 12 then it is at most only one half turn of resistance wire away from a point on ring 35 and consequently may be assumed to be equivalent to a tap placed on ring 35 directly. That is, electrically speaking, there is little difference whether a tap is placed on ring 12 or on ring 35 because of the many interconnections.

By experiment it has been found that considerably less than 100 wires are sufficient for all practical purposes. With six wires such as shown in Fig. 4, rings 12 and 35 may be used with taps or sliders placed on either one, the electrical results being almost identical as far as the external circuits are concerned.

Similarly, if there are three transmitters, as shown in Fig. 4, or even more than three transmitters, then by furnishing sufficient interconnecting wires such as 36 and 43 all of the resistor rings may be considered as being electrically ganged together so that a tap or slider placed on one of them will have the same effect as if it were placed upon a corresponding position in any other transmitter ring.

As will be apparent from the previous explanations, an angular displacement of any group or set of taps is electrically equivalent to an equal angular rotation of any other set of taps. Hence it is quite possible to mount those taps which have been described as slidable taps as fixed taps and the taps described as fixed taps as slidable taps.

It will further now be clear that the angular displacements of rotor 1 and pointer 3 will be controlled by a rotation of any of the tap groups 13—15, 38 and 47 respectively. Consequently, the indication of pointer 3 will reproduce a simple sum of the individual rotations of all the tap groups.

In the previous description, each of the transmitters has been described as being controlled by the level of a liquid. However, it should be understood that the movement of the transmitters can also be controlled by various other instrumentalities. For example, a knurled knob 31' may be provided on shaft 31 to permit this shaft and the disc 30 to be rotated by hand. This will make it possible to employ transmitter I for purposes of fine adjustment of the position of the receiver pointer 3 in relation to its dial.

The modification according to the invention which is illustrated in Fig. 5 is very similar to the circuit arrangement according to Fig. 4. The same reference characters are used for similar or equivalent parts.

The three transmitter rings 12, 35, 46 are shown as concentrically arranged. The three rings are connected by a plurality of wires, one connecting point of each wire being slidable and the other fixed. The slidable connecting points or taps of the wires may be mounted as has been shown in Fig. 4. The displacement of the slidable taps or connecting points corresponding to a change of a unit to be measured or checked may be obtained by means of a float such as has been also described in connection with Fig. 4.

The indicating instrument such as a ratio meter which has been shown in Fig. 4 as an A.-C. instrument is illustrated in Fig. 5 as a D.-C. instrument having a permanent magnet rotor 1. The source of current 16 is connected to resistor ring 46 by leads 17, 18, 17', 18' and fixed taps 51, 52 and 51', 52', respectively instead of a single set of connecting taps as shown in Fig. 4. The more complicated potential pattern that is impressed upon the transmitters by employing a plurality of sets has as an advantage that it will reduce the required rotation of the set of sliding taps such as 47 in response to a change of the liquid contents of a tank to cause a desired movement of the receiver pointer.

It should, of course, be understood that a totalizing system or device as has been illustrated in Figs. 4 and 5 and described in connection with these figures can also be designed in connection with the basic circuit shown in Fig. 2, by simply providing several transmitter resistors and interconnecting them as was previously described.

The receiver has been previously described and illustrated as an indicating instrument. However, it should be understood that the invention is not limited to the use of an indicating or recording receiver. For example, the receiver may be equipped with a pinion in place of a pointer and may then rotate a rack or gear. Such an arrangement can be used for tuning a radio set, operating a valve, etc.

Fig. 6 shows a receiver of the A.-C. Selsyn type for driving a variable condenser. Such receivers are capable of performing numerous light duty control operations. According to Fig. 6 coil 60 of a Selsyn system is connected at three equidistant points by leads 9, 10 and 11 to the slidable taps of a transmitter system such as has been shown, for example, in Fig. 2. The A.-C. magnet rotor 61 which is rotatably mounted serves to rotate a shaft 62 supporting the movable plates 63 of a variable condenser 64.

While the invention has been described in detail with respect to certain preferred examples and embodiments, it will be understood by those skilled in the art after understanding the invention, that various changes and modifications may be made without departing from the spirit and scope of the invention and it is intended therefore

What is claimed is:

1. An electrical telemetering system for setting a single receiving instrument in accordance with the total of a plurality of individual physical magnitudes which are respectively arranged to control the positions of movable members of transmitters, comprising a plurality of transmitters connected to be responsive to said physical magnitudes respectively, each of said transmitters including an electrically endless resistance, and a member having a plurality of electrically separate contactors engaging predetermined different points along said resistance, means for relatively moving said resistance and said contactors in accordance with the physical magnitude arranged for controlling each of said transmitters respectively, said transmitters being arranged in a series from a first transmitter to a last transmitter, a source of E. M. F. electrically connected to predetermined points of the resistance of one of said transmitters, a plurality of electrical connections from each of said transmitters to the next in said series, said connections extending between said contactors of one of said transmitters and points along the resistance of the next transmitter in said series, which points are located at positions respectively corresponding to said contactors; a receiving instrument having a rotor and at least three stationary deflecting coils; and electrical connections from the last transmitter of said series to said deflecting coils of said receiver for controlling the position of said rotor in accordance with the total of said physical magnitudes.

2. An electrical telemetering system for setting a single receiving instrument in accordance with the total of a plurality of individual physical magnitudes which are respectively arranged to control the positions of movable members of transmitters, comprising a plurality of transmitters responsive to said physical magnitudes respectively, said transmitters being arranged in a series from a first transmitter to a last transmitter, each of said transmitters including a stationary toroidally wound, endless resistance, and a movable member of electrically non-conductive material carrying a plurality of symmetrically disposed and electrically separate contactors, each of which engages said resistance, so that all said contactors are movable as a unit without relative movement therebetween upon movement of said member, a source of E. M. F. electrically connected to predetermined points of the resistance of one of said transmitters, a plurality of electrical connections from the contactors of each of said transmitters respectively to fixed points on the resistor of the next succeeding transmitter of said series, which points are arranged on the last named resistor in a manner corresponding respectively to the arrangement of said contactors on said member; a receiving instrument having a rotor and at least three stationary deflecting coils, and electrical connections from contactors of the last transmitter of said series to said deflecting coils of said receiver for controlling the position of said rotor in accordance with the total of said physical magnitudes.

3. An electrical telemetering system in accordance with claim 2, wherein the contactors of each of said transmitters are equi-angularly disposed about the rotatable members of such transmitter.

4. An electrical telemetering system in accordance with claim 2, wherein there are six contactors equi-angularly arranged about the non-conducting rotatable member of each of said transmitters; wherein the connections from each transmitter to the next in said series consist of six connections from said contactors respectively of one of said transmitters to points 60° apart on the toroidally wound resistance of the next succeeding transmitter and in the same relative arrangement respectively; and wherein said receiving instrument has three symmetrically disposed deflecting coils, one end of each of which is connected by an electric conductor to contactors arranged at 120° to one another on the rotatable member of the last transmitter of said series.

5. An electrical telemetering system in accordance with claim 2, wherein there are six contactors equi-angularly arranged about the non-conducting rotatable member of each of said transmitters; wherein the connections from each transmitter to the next in said series consist of six connections from said contactors respectively of one of said transmitters to points 60° apart on the toroidally wound resistance of the next succeeding transmitter and in the same relative arrangement respectively, wherein said receiving instrument has three symmetrically disposed deflecting coils, one end of each of which is connected by an electric conductor to contactors arranged at 120° to one another on the rotatable member of the last transmitter of said series; and wherein said source of E. M. F. has two terminals connected to uniformly spaced points of the resistor of the first transmitter of said series.

6. An electrical telemetering system in accordance with claim 2, wherein said source of E. M. F. is an A.-C. source connected to the toroidally wound resistance of one of said transmitters; and wherein said receiving instrument has a rotor mounted to rotate about a predetermined axis and provided with a coil having its axis at right angles to the axis of rotation of said rotor, said coil being energized by A.-C. current from the same source of E. M. F.

7. An electrical telemetering system in accordance with claim 2, wherein said source of E. M. F. is a D.-C. source having one terminal connected to diametrically spaced points on the toroidally wound resistance of one of said transmitters, and having its other terminal connected to points on the same resistance at 90° from the points to which said one terminal is connected.

ABRAHAM EDELMAN.

REFERENCES CITED

The following references are of record in the file of this patent:

UNITED STATES PATENTS

| Number | Name | Date |
|---|---|---|
| Re. 14,475 | Troll | May 21, 1918 |
| 1,448,402 | Hayes | Mar. 13, 1923 |
| 1,612,117 | Hewlett | Dec. 23, 1926 |
| 1,655,244 | Rowell | Jan. 3, 1928 |
| 2,025,774 | Rennick et al. | Dec. 31, 1935 |
| 2,104,898 | De Giers | Jan. 11, 1938 |
| 2,197,636 | Faus | Apr. 16, 1940 |
| 2,345,936 | Jewell | Apr. 4, 1944 |
| 2,405,689 | De Giers | Aug. 13, 1946 |
| 2,411,712 | De Giers | Nov. 26, 1946 |

FOREIGN PATENTS

| Number | Country | Date |
|---|---|---|
| 584,437 | France | Nov. 20, 1924 |